Nov. 10, 1953 N. CICCONE 2,658,283
MEASURING BLOCK DEVICE FOR TOOL LATHES
Filed June 5, 1952
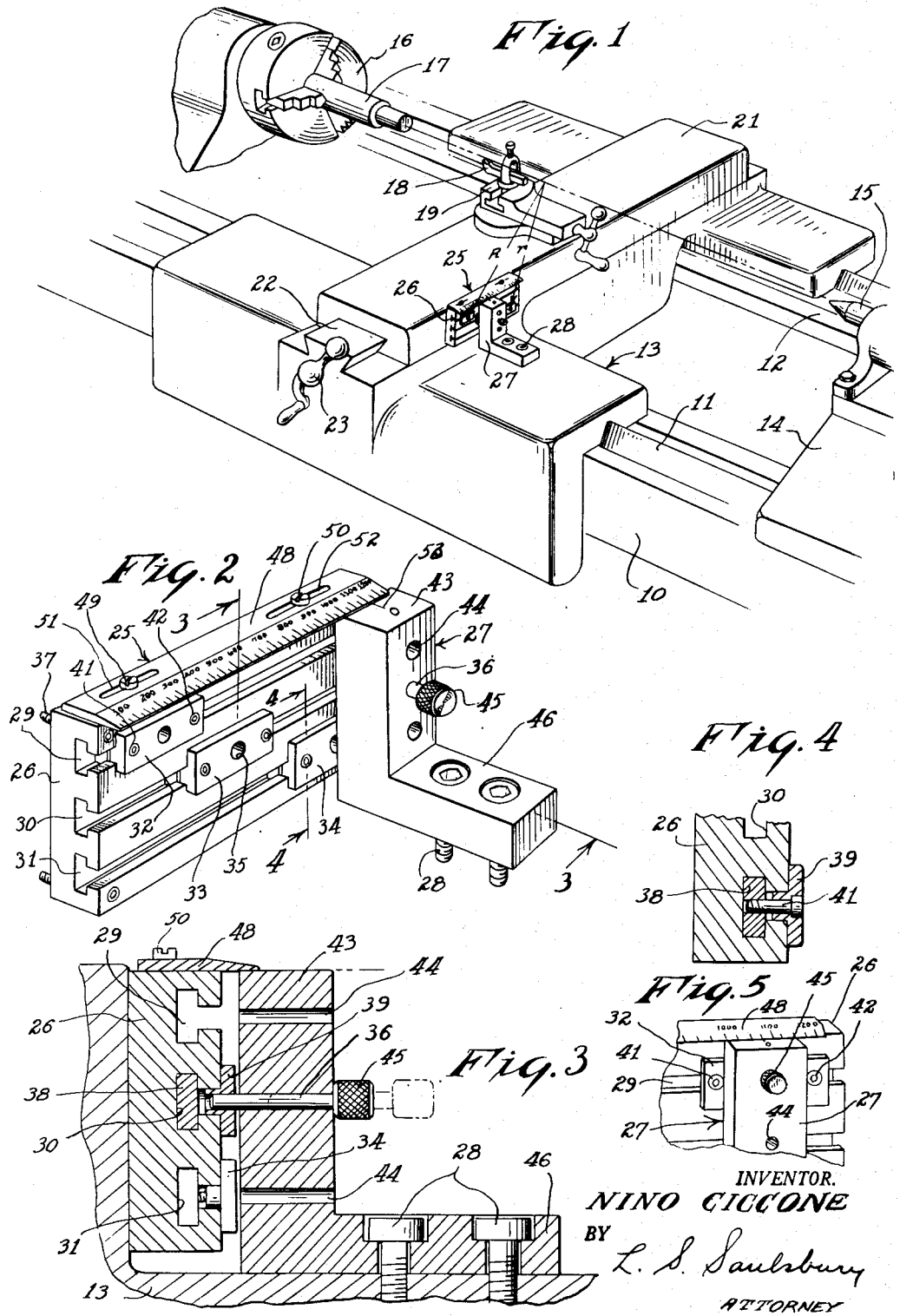
INVENTOR.
NINO CICCONE
BY
L. S. Saulsbury
ATTORNEY Patented Nov. 10, 1953

2,658,283

UNITED STATES PATENT OFFICE 2,658,283

MEASURING BLOCK DEVICE FOR TOOL LATHES

Nino Ciccone, New York, N. Y., assignor of one-half to Stephen Lusick, Brooklyn, N. Y.

Application June 5, 1952, Serial No. 291,945

1 Claim. (Cl. 33—185)

This invention relates to a measuring block for tool lathes.

It is an object of the present invention to provide a measuring block for tool lathes which will make possible the production of a work piece having different diameters wherewith a less skilled or beginner machinist can work and increase the production on a given lathe.

It is another object of the invention to provide a measuring block for tool lathes which is easy to install upon the lathe carriage and which is easy to adjust to the different diameters of the work piece and wherein the adjustable blocks are adequately and firmly held in their adjusted positions and their openings readily made available to the retaining pin which is inserted in the vertical openings of the member which is fixed to the carriage base.

Other objects of the invention are to provide a measuring block device for tool lathes which is of simple construction, inexpensive to manufacture, has a minimum number of parts, easy to install upon the lathe, easy to adjust to the different diameters, compact, efficient in operation and convenient to use.

For other objects and for a better understanding of the invention, reference may be had to the following detailed description taken in connection with the accompanying drawing in which:

Fig. 1 is a perspective view of a lathe bed having a carriage thereon and the device of the present invention attached to the carriage;

Fig. 2 is an enlarged perspective view of the measuring block device embodying the features of the present invention and removed from the carriage;

Fig. 3 is an enlarged vertical sectional view taken on line 3—3 of Fig. 2;

Fig. 4 is a fragmentary vertical sectional view taken on line 4—4 of Fig. 2;

Fig. 5 is a fragmentary perspective view showing the pin in place in one of the adjustable members.

Referring now to the figures, 10 represents a lathe bed having guideways 11 and 12 on which a carriage 13 is adjustable. The usual tail stock 14 is also adjustable on the lathe bed and has the usual centering pin 15. At the opposite end of the lathe is the drive chuck 16 in which is secured a work piece 17. This work piece is to be provided with different diameter portions by the cutting tool element 18 fixed to the vise 19 mounted on the carriage 13. The carriage has a transversely adjustable part 21 that carries the vise 19 and the tool 18. This part is adjustable on keyway 22 which extends transversely of the lathe bed. The part 21 is adjusted by a hand crank 23 on the front of the carriage.

The present device is indicated at 25 and comprises a part 26 which is secured to the transversely adjustable part 21 of the lathe carriage and a part 27 that is fixed by screws 28 to the base part of the carriage 13.

The part 26 of the device has longitudinally extending vertically spaced guideways 29, 30 and 31 in which are disposed respectively adjustable members 32, 33 and 34. Each adjustable member has a hole 35 for receiving a pin 36 that extends from the part 27. The part 26 is made secure to the transversely adjustable block 21 of the carriage 13 by screw bolts 37 which extend through the corners of the part 26 and into threaded openings which will be provided in the lathe carriage.

Each of the members 32, 33 and 34 comprises an inner part 38 and an outer part 39 having the opening 35. In order to clamp the member 32 to the guideway screws 41 and 42 extend into the parts 38 and 39 and when tightened will draw the part 38 toward the part 39 so that both parts will have clamping engagement with their respective inner and outer faces of the guideway. In this manner the opening 35 can be disposed in a location in exact conformity to the work piece diameter. To locate the tool 18 so as to cut the work piece to the required dimensions, the members 32, 33 and 34 are set and clamped in their proper positions. These members are sufficiently narrow so that screws 41 and 42 will be accessible at the opposite sides of upstanding portion 43 of the part 27. This upstanding portion has vertically spaced holes 44 for receiving the pin 36. The pin 36 has a knob 45 by which the pin 36 can be grasped. The part 27 has a horizontal portion 46 through which screws 28 are extended for fixing the part 27 to the base of the carriage 13.

On the top edge of the part 26 is fixed a measuring scale 48 by means of screws 49 and 50 extending respectively through elongated slots 51 and 52 of the scale 48. A zero indication 53 is provided on the upper end of the vertical portion 43 of the part 27.

It can readily be seen that, once the members 32, 33 and 34 have been adjusted to the desired diameters of the work piece, by a simple withdrawal of the pin 36 from an opening of one of these members and from an opening 44 in the part 27, the tool can be set up for working of a new diameter on the work piece. The pin 36 will be inserted in another hole 44 of the part 27 and in another hole 35 of the part 26. The cutting tool 18 will cut in the work piece 17 automatically to the desired diameter and there will be no need for making more than the one final cut in order to bring the portion of the work piece to the desired diameter. It can be seen that with this device the production of the tool lathe can be increased and that the tool lathe can now be operated by one who may be a beginner and not too familiar with bringing the work piece to the exact size.

While various changes may be made in the detailed construction, it shall be understood that such changes shall be within the spirit and scope of the present invention as defined by the appended claim.

What is claimed is:

A measuring block device for a tool lathe comprising an angle part having a horizontal portion adapted to be fixed to a tool lathe carriage and having a vertical portion with vertically spaced openings therein, another part having horizontally extending guideways and adjustable members disposed respectively in the guideways, clamping means associated with each member for fixing said member to the guideways, each member having an opening therein, a pin insertable through a selected one of the openings of the vertical portion of the one part for engagement with an aligned opening of an adjustable member to retain said portion and the selected adjustable member in aligned relation, said clamping means comprising a part slidable in said guideway, screws disposed on the opposite ends of the part and another part having openings therein for receiving said screws, whereby the parts of the member are fixed to the guideway when the screws are tightened, each member being longer than the width of the vertical portion of the one part so that the screws of the clamping means are accessible from the opposite side of the vertically extending portion of the one part and may be tightened while the pin is in the opening of the member.

NINO CICCONE.

References Cited in the file of this patent

UNITED STATES PATENTS

| Number | Name | Date |
|---|---|---|
| 535,487 | Coes | Mar. 12, 1895 |
| 1,405,670 | Craley | Feb. 7, 1922 |
| 2,032,598 | Shaw | Mar. 3, 1936 |
| 2,468,325 | Eisele | Apr. 26, 1949 |
| 2,572,361 | Luning | Oct. 23, 1951 |